Jan. 2, 1934. C. E. LAWRENCE 1,942,339
PICTORIAL ART COMPOSITION
Filed April 28, 1932 2 Sheets-Sheet 1

Inventor
Clifford E Lawrence
By Blair &
Kilcoyne
Attorneys

Jan. 2, 1934.  C. E. LAWRENCE  1,942,339
PICTORIAL ART COMPOSITION
Filed April 28, 1932   2 Sheets-Sheet 2

Inventor
Clifford E. Lawrence
By
Attorneys

Patented Jan. 2, 1934

1,942,339

UNITED STATES PATENT OFFICE 1,942,339

PICTORIAL ART COMPOSITION

Clifford E. Lawrence, Newton Highlands, Mass., assignor to Catherine Blum Lawrence, Boston, Mass.

Application April 28, 1932. Serial No. 608,063

2 Claims. (Cl. 35—12)

This invention relates to the art of picture composition, according to the practice of which a plurality of selected individual picture units, each depicting an individual subject of art, instruction, entertainment, or the like, may be arranged in a manner entirely original with the composer, to form a flat field picture composition.

An object of the invention is to induce an original practice by beginners or children in the art of creative picture composition. Another object is to provide an educational and entertaining practice in the art of original composition especially suitable to the talents and training of young children and persons unfamiliarly in the practice of the fine arts. A further object is the teaching of the art of making pictorial compositions of an original nature by the selection from a collection of picture units and the proper placement, according to the sense of fitness and originality of the individual, of the selected units or elements capable of forming in combination a finished art composition. A further object is to provide a practice of instruction by pictorial means. A further object is the provision of a plurality of picture units, each depicting an individual subject of art, instruction, entertainment, or the like, preferably in color, and each capable of forming an element of an art composition, which units are capable of selection and placement in an endless number of combinations. A further object is the provision of a plurality of individual units of composition of the above character which are drawn to a universal perspective whereby such units may be related to each other according to the dictates of originality to give effects of background, depth, foreground, and the like, in a composition consisting of an association of such units.

Other objects will be in part obvious from the annexed drawings and in part indicated from the following analysis of the invention, in which reference is made to the accompanying drawings illustrating an embodiment of my idea.

In the drawings—

Figure 1:
Fig. 1 is a representation of a plurality of individual art units such as were necessary to build the composite finished composition as shown in Fig. 10.
Figure 10:
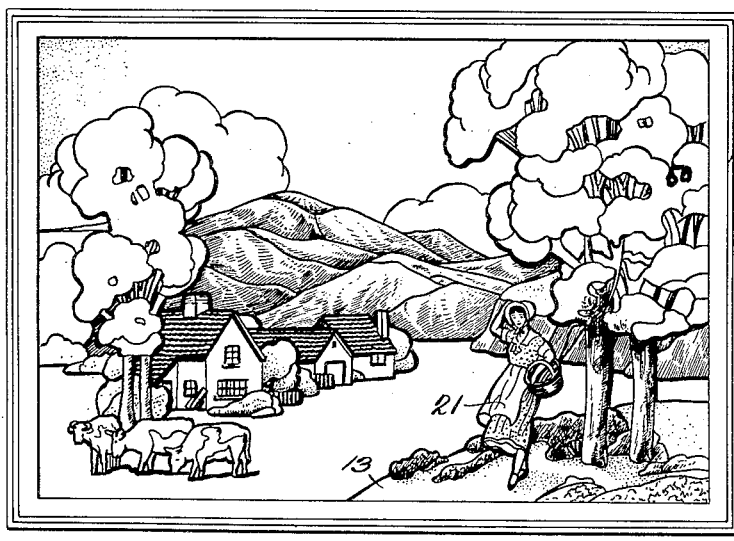
Fig. 10 represents the finished composition as a framed, completed picture.
Figure 2:
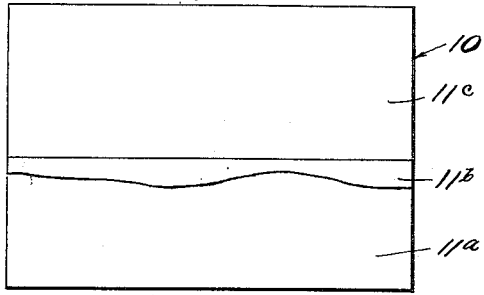
Figs. 2 through 9 illustrate partially complete compositions built up from the individual units or elements of Fig. 1.
Figure 3:
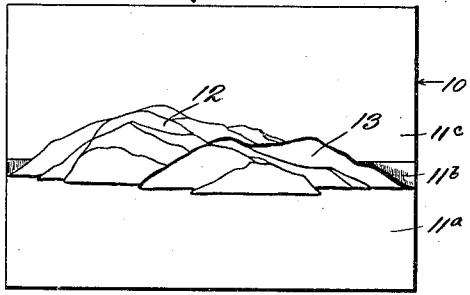
Figure 4:
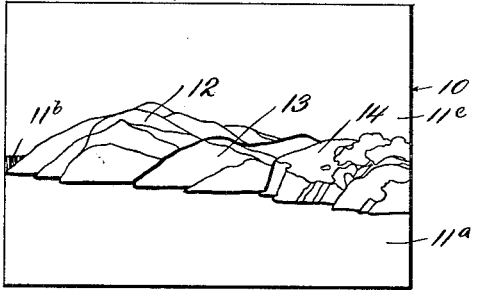

Referring now to Fig. 1, there is illustrated a plurality of picture units of which, in conjunction with the background unit illustrated in Fig. 2, a completed composition as shown in Fig. 10 may consist. In the preferred form of my invention, the picture units, each of which depicts a subject, preferably an art subject, which is complete in itself and unrelated to the subjects of other units, may be furnished as "cut-outs" as illustrated, or may be provided collectively on sheets or individually, and cut out by the composer when desired. The picture units and the background unit may be broadly designated as "sheet units". An important feature of my invention lies in the fact that the art subjects of the picture units are drawn or prepared to a universal perspective; that is to say, the subjects are so drawn or constructed that the units may be moved laterally or vertically with respect to each other and to an appropriate background unit without distorting a composition arranged from said units or giving to the composition a sense of "wrongness" such as would accompany a like shifting or moving of units containing subjects drawn or constructed to linear and/or atmospheric perspective.

In explanation of the above, a conventional pictorial representation of objects, whether it be a composition of still life or of scenery attains its natural effect from the principles of perspective therein followed. In the prior art, there are two forms of perspective employed in the conventional making of a picture. First, linear perspective, or the relation of objects to each other in point of size according to distance; and, second, atmospehric perspective, or the strength of tone and clearness of detail of objects according to distance.

In linear perspective, all lines horizontal to the ground plane, but running at an angle to the line of vision of the observer, converge to a point called the "vanishing point" on the horizon line or eye level. All parallel lines horizontal to the ground plane converse to the same "vanishing point". With several rectangular objects, such as houses, set at different angles to the observer, there are separate vanishing points for each house, but all such vanishing points fall on the horizon line or eye level.

It follows, therefore, that objects drawn to linear perspective, and which form the subjects of picture units for making pictorial compositions, have a certain definite position in relation to the vanishing point of a composition or to the horizon line (eye level) thereof. If units whose subjects are prepared in accordance with the principles of linear perspective are moved from such positions, the composition becomes unnatural and distorted and one can sense the "wrongness". Accordingly, utilization of such type of perspective of the subjects of the units has been found by me to be unsatisfactory, as such would limit very materially the number of compositions which could be prepared from a limited number of picture units.

Any violation of the principles of atmospheric perspective, also, would have the effect of making the conventional picture appear unnatural. For example, a tree place in the foreground would stand out boldly, its contours well defined, its details clear, its lights and shadows in sharp contrast. Another tree in the background would appear more indefinite in outline, with its details blurred or lost altogether and softer in general effect. If the positions of these two trees are reversed, there is at once a feeling of "something wrong" and sense of distance is immediately lost.

In the present invention I have avoided, in the preparation or construction of the individual art subjects of the picture units, the conventional principles of linear and atmospheric perspective and rely instead on illusionary effects to give distance and solidity to a composition built up from a plurality of picture units. I accordingly draw or construct the subjects of the picture units to give the aforesaid illusionary effects as follows: Subjects representative of fabricated objects, such as houses, bridges, etc., are drawn without any converging lines or perspective and with their normally horizontal lines parallel to each other. An effect of perspective is obtained, not by converging lines, but by shading a side of an object, such as the side of a house that is in shadow, thereby giving a three-dimensional effect. Subjects which are representative of objects of nature, such as trees, bushes, hills and the like, are drawn to a general scale without regard to relative size as far as possible in simple outline form and without detail. Coloring of the subjects is made by using flat tints of color of the same general tone throughout and without any form or gradation, reliance being had only on the outlines of the subjects for separation of the subjects in different planes.

The placement of the units in relation to each other, as proposed in my present invention, may further be utilized to give depth and plane relation to the ultimate composition. Thus, in composing the picture of Fig. 10 I have selected for purpose of illustration as elements thereof a mountain, a house, a tree, and a clump of shrubbery as shown in Fig. 1. If the mountain is placed on the background and partially obscured by the unit depicting a tree, the montain is definitely set back, and is representative of a more distant plane than the tree. If the house is placed to partly obscure the tree, the house becomes the foreground, but by placing the shrubbery before the house, the illusion of depth in the resulting composition is carried still further. As a further art feature of the units, the type of drawing and the coloring of the subjects is such that all of the colors of the units have a modicum of color harmony, whereby the finished composition is in color blending and pleasing appearance.

In the practice of my invention, the composer begins with the base or background unit 10, Fig. 2, which unit may be arranged on any suitable supporting surface. This background unit preferably forms the basis of every picture composition and is itself one of the picture units as aforesaid and is preferably made in the same manner and of the same material. It is designed and colored to represent land, as at 11a, water as at 11b, and sky as at 11c, and in consequence permits of a wide variety of effects. Upon this background unit 10 the finished composition as shown in Fig. 10 was constructed.

Figs. 2 through 10 illustrate the serial steps in the building of one of the endless number of original compositions from a collection of picture units, of which the units 10 through 21, Figs. 1 and 2 represent only those selected units employed in composing the composition of Fig. 10.

With the above in mind, the second step in the building of composition of Fig. 10 was to superimpose on the background unit 10 the mountain range represented by units 12 and 13. Such units are shown in place in Fig. 3. In the manner that the units 12 and 13 were arranged on the background unit 10, the unit 13 partially obscuring the unit 12, the unit 14 was arranged in partially obscuring relation to the unit 13 and depth of background was established.

It is notable here to point out that the art subjects of the said units making up the picture to its present state have relationship only because the one composing the picture composition of Fig. 10 desired that particular type of composition. The units are capable of being shifted until the composer establishes the correct or most advantageous perspective desired for the composition in mind. The placement of these units on the background rests wholly with the composer, whose sense of fitness and perspective will direct the proper depth relation of the particular subjects. This free shifting and selection of picture units for original work and the fact that no previous art knowledge is required is the essence of the invention. Further, the composer is not limited in this shifting of the units as he would be if the subjects of the units were prepared or drawn according to the principles of linear or atmospheric perspective.

Figure 5:
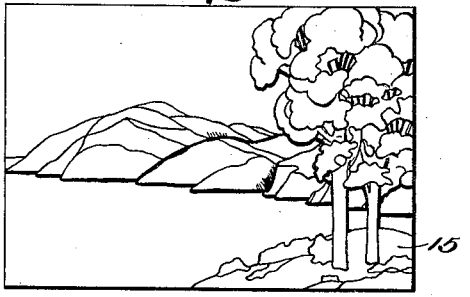
Figure 6:
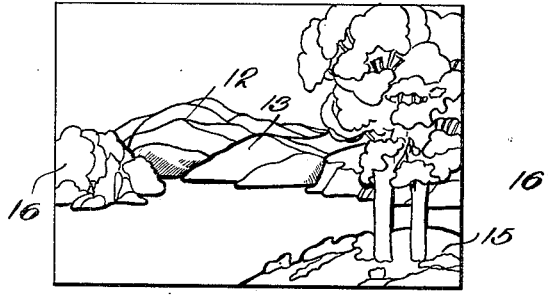
Figure 7:
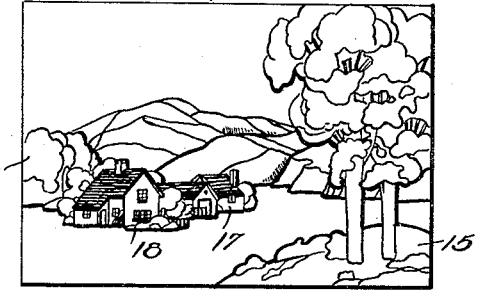
Figure 8:
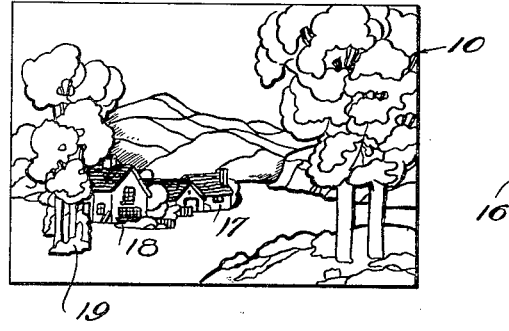
Figure 9:
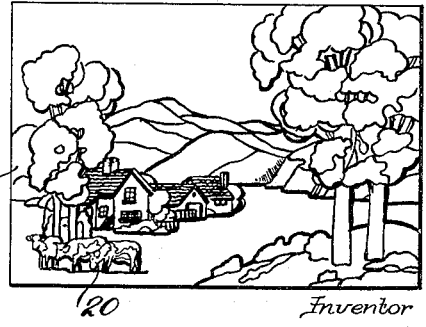

By reference to Fig. 5, unit 15 depicting a landscape subject and trees was arranged at the lower right corner of the background unit 10, such placement giving the subject a foreground effect. By relation to the background and sub-background units 12, 13 and 14, and the perspective and plane relation of the subjects of said units with the foreground unit 15, it will be seen that the unit 15 represents a hill or elevation having trees in the immediate foreground and is arranged in partially obscuring relation to the units 13 and 14.

To complete the depth effect of the basic background unit 12, unit 16 (Fig. 6) was arranged at the left side of the partially completed picture, said unit depicting as its subject a clump of trees placed in partially obscuring relation to the mountain range forming the subject-matter of the said unit 12.

Thereupon units 17, 18 and 19 were suitably arranged with relation to the previously applied units, the unit 18 being in partially obscuring relation with respect to the unit 17, with unit 19 in partially obscuring relation to the unit 18, thus establishing plane and depth relationship of the respective subjects depicted. There is obtained an illusion of depth permitted by the perspective relationship of all of the units which are, as previously pointed out, otherwise unrelated.

In the left foreground, the unit 20 representing cattle was placed in such relationship as to give the subjects of units 17, 18 and 19 a further illusion of depth.

In Fig. 10 the unit 21, depicting the figure of a girl, was arranged in the foreground of landscape units 15 and placed in such manner that the subject of unit 21 occupies the immediate foreground of the completed picture which is illustrated in Fig. 10. In the completed picture, the cloud effects are obtained by placing units 22 against the background unit 10 as to be partially hidden by units 12 and 13.

In order that the composer may preserve, at least temporarily, his composition, and thereby stimulate his interest further, I find it desirable to provide with the collection or series of units a picture framing arrangement, consisting preferably of a cardboard base, which may for example have been the base upon which the background unit 10 was initially placed as aforesaid, a frame 23 (Fig. 10), and a transparent sheet of heavy cellophane or glass, of dimensions such as to be held by the frame. Thus the cellophane or glass sheet may be laid over the loose units 10 through 21 of the composition of Fig. 10 and the frame placed thereover and held to the base by suitable securing or clamping means. The units are thereupon held by the cellophane or glass sheet against the base by pressure until released for the building of other compositions.

While in Fig. 1 I have shown the various units utilized in the finished composition shown in Fig. 10, it is to be understood that these units are merely illustrative of a selected number of a series or collection of such units as comprehended by my invention. Preferably there may be provided a series of forty of the art units, any number of which may be selected as elements of a desired composition, the series of units representing a group of art subjects from which any number of picture compositions may be built.

Preferably, each of the subjects of the units of the series appear sharply, and this effect is obtained by outlining the subject of the unit and the unit itself in black. This has the effect of making all subjects, including the background subjects, appear equally sharp and in focus, so that the ultimate composition is clear and well defined in all its detail. I have further found that superimposed units have a tendency when assembled on a base and framed to spring a slight distance away from the units underneath, thus creating a further illusion of depth and of distinct plane relations.

It will further appear from the above that great originality of composition according to my improved art is permitted and that a practically endless number of compositions may be built from a relatively limited number of units, this latter by reason of the fact that no one of the subjects of the units must be arranged in a definite or predetermined position in respect to other subjects or to the subject of the background. While the child or older person manipulating the units may have no art ability, his sense of fitness will generally permit him to establish the various units in relation to each other in such manner as to create a desirable composition. In so doing his steps are wholly creative and, unconsciously, he will obey the fundamentals of art instruction in building by means of the units as aforesaid an art composition which is original with him, and thus be taught objectively the fundamentals of composition, perspective, and harmony in colors.

Further, the materials of the recommended mode of practice of this invention are relatively few, simple, and cheap. While it has been hereinbefore pointed out that the invention has special application to children and persons untrained in the fine arts, it will be obvious that the materials and mode of operation thereof in accordance with the present invention are suitable for commercial designing, advertising, art, instruction, and the like.

Without further analysis the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim:

1. A pictorial composition of sheet units comprising a background unit and a plurality of picture units arranged thereon in a manner determinable by the individual composer, said picture units being constructed according to principles of universal perspective.

2. A collection of sheet units for making a plurality of pictorial compositions, one of said units being a background unit adapted to form a background for the other units, and said other units being picture units, each pictorially representative of an individual subject and adapted for arrangement on the background in a manner determinable by the individual composer, said picture units being constructed according to principles of universal perspective.

CLIFFORD E. LAWRENCE.